United States Patent
Toeroe

(10) Patent No.: US 10,025,610 B2
(45) Date of Patent: Jul. 17, 2018

(54) AVAILABILITY MANAGEMENT OF VIRTUAL MACHINES HOSTING HIGHLY AVAILABLE APPLICATIONS

(71) Applicant: Maria Toeroe, Montreal (CA)

(72) Inventor: Maria Toeroe, Montreal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 22 days.

(21) Appl. No.: 14/888,072

(22) PCT Filed: Mar. 28, 2014

(86) PCT No.: PCT/IB2014/060280
§ 371 (c)(1),
(2) Date: Oct. 29, 2015

(87) PCT Pub. No.: WO2014/177950
PCT Pub. Date: Nov. 6, 2014

(65) Prior Publication Data
US 2016/0085580 A1 Mar. 24, 2016

Related U.S. Application Data

(60) Provisional application No. 61/817,659, filed on Apr. 30, 2013.

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5077* (2013.01); *G06F 11/008* (2013.01); *G06F 11/1484* (2013.01); *G06F 2009/4557* (2013.01)

(58) Field of Classification Search
None
See application file for complete search history.

(56) References Cited

U.S. PATENT DOCUMENTS 8,015,432 B1 * 9/2011 Vaidya ................ G06F 11/2028
714/4.11
8,386,838 B1 * 2/2013 Byan ................... G06F 11/1484
714/5.11

(Continued)

FOREIGN PATENT DOCUMENTS

WO 2009019631 A2 2/2009
WO 2009083827 A1 7/2009

OTHER PUBLICATIONS

Bassek et al, Redundancy Schemes for High Availability Computer Clusters, 2006, Journal of Computer Science 2 (1) pp. 33-47.*

(Continued)

*Primary Examiner* — Abu Zar Ghaffari
(74) *Attorney, Agent, or Firm* — David J. Rahmer; Ericsson Canada Inc.

(57) ABSTRACT

A configuration is generated that enables Availability Management Framework (AMF) to manage virtual machines (VMs) and support hardware redundancy for each of service groups (SGs). Each component service instance (CSI) is configured to represent one or more of the VMs to be managed by AMF. Configuration attributes are set to associate each VM with one CSI, such that the VMs to be hosted on a same physical host are associated with different CSIs of a same service instance. Service units (SUs) of different SGs are configured such that each SU is hosted by any one VM on the same physical host, while the different SUs of a same SG are mapped to the VMs hosted on different physical hosts. The configuration enables the AMF to manage an application formed by the SGs in a virtualized environment (Continued)

in a same way as in a non-virtualized environment without modification to the application.

24 Claims, 8 Drawing Sheets

(51) Int. Cl.
*G06F 11/00* (2006.01)
*G06F 11/14* (2006.01)

(56) References Cited

U.S. PATENT DOCUMENTS

| | | | | |
|---|---|---|---|---|
| 8,443,367 | B1* | 5/2013 | Taylor | G06F 9/52 |
| | | | | 718/1 |
| 9,195,528 | B1* | 11/2015 | Sarda | G06F 11/00 |
| 9,229,843 | B2* | 1/2016 | Abbot | G06F 11/2023 |
| 2008/0152151 | A1* | 6/2008 | Pourzandi | G06F 21/53 |
| | | | | 380/286 |
| 2009/0044186 | A1* | 2/2009 | Biro | G06F 9/541 |
| | | | | 718/1 |
| 2009/0150711 | A1* | 6/2009 | Kami | G06F 11/008 |
| | | | | 714/1 |
| 2009/0164832 | A1* | 6/2009 | Kanso | G06F 8/65 |
| | | | | 714/1 |
| 2010/0057908 | A1* | 3/2010 | Smith | G06F 9/5077 |
| | | | | 709/225 |
| 2011/0153806 | A1* | 6/2011 | Bagasra | G06F 8/60 |
| | | | | 709/224 |
| 2011/0225095 | A1* | 9/2011 | Gawali | G06F 11/2023 |
| | | | | 705/300 |
| 2011/0270595 | A1* | 11/2011 | Salehi | G06Q 10/00 |
| | | | | 703/6 |
| 2011/0314465 | A1* | 12/2011 | Smith | G06F 9/5077 |
| | | | | 718/1 |
| 2013/0061086 | A1 | 3/2013 | Kiyoshi | |
| 2013/0179574 | A1* | 7/2013 | Calder | G06F 9/5033 |
| | | | | 709/226 |
| 2013/0283264 | A1* | 10/2013 | Bhattacharya | G06F 9/45558 |
| | | | | 718/1 |

OTHER PUBLICATIONS

Dazhi Wang et al.,"Modeling User-Perceived Service Availability", Jan. 1, 2005, Service Availability Lecture Notes in Computer Science; LNCS, Springer, Berlin, DE; pp. 107-122.

Kielhofer, Patrick, International Search Report for PCT/IB2014/060280, EPO, The Netherlands, dated Jul. 16, 2014.

* cited by examiner

AVAILABILITY MANAGEMENT OF VIRTUAL MACHINES HOSTING HIGHLY AVAILABLE APPLICATIONS

TECHNICAL FIELD

Embodiments of the invention relate to the availability management of virtual machines.

BACKGROUND

The Service Availability (SA) Forum has defined the Availability Management Framework (AMF) for managing the availability of services provided by a compliant system. The availability management of virtual machines (VMs) and the applications residing on them is a hot subject as availability is a key premise for cloud computing. Currently, the research community has sought for different solutions for different layers of the availability management architecture. These solutions usually overlap and, as a result, often interfere with each other when used together.

Virtualization solutions provide some solution for availability. In this context, each physical host runs one or more virtual machines, which can be treated as logical nodes. The software managing multiple VMs on the host is the virtual machine manager (VMM) or hypervisor. For availability management, VMMs run in a cluster. VMMs typically detect host and VM failures.

In general, there are two types of solutions to VM failures. Most often a failed VM is restarted from its stored image on the same VMM. If the host fails then all of its VMs are restarted on a different VMM.

Some vendors provide another solution in which VMs run in tandem. The protected VM is replicated on a different host as a hot standby VM, which runs in parallel and synchronized with a protected primary VM using, for example, lockstep. In lockstep, the standby VM receives all the input the primary VM receives and executes everything the primary does, but its output is suppressed by the VMM. As a result this standby can take over the execution any moment the primary VM fails as long as the failure is caused by an external reason.

One main advantage of these virtualization solutions is that they do not modify the applications that run on the virtual machines. However, these solutions are unaware of the applications, and do not detect and therefore do not react to application failures. In addition, when the replication is done at the VM level, there is no fault isolation between the primary and the standby VMs. As a result, the application failures are propagated to the standby VM, hence the failure occurs in the standby exactly the same way as in the primary.

Furthermore, the virtualization layer (e.g., in a cloud computing environment) hides the underlying infrastructure from applications. As a result, availability solutions at the application level are disabled. Therefore, these virtualization solutions cannot decide on the proper distribution of redundant entities to protect application services against hardware failures.

There is a need to address the application level availability management that provides the needed hardware redundancy without interference with other layers that may react to the same failure.

SUMMARY

According to one embodiment, a method performed by a computer system is provided for generating an AMF configuration that enables AMF to manage a plurality of VMs and support hardware redundancy for each of a plurality of service groups (SGs). Each SG includes a plurality of service units (SUs), and each SU is a unit of redundancy for services provided and protected by an SG. The method generates, according to a redundancy model and configuration attributes, a first portion of a configuration that configures a set of service instances (SIs) to represent workload, wherein each SI contains a set of component service instances (CSIs) and each CSI represents one or more of the VMs to be managed by AMF. The method further generates a second portion of the configuration that sets the configuration attributes to associate each VM with one of the CSIs, such that the VMs to be hosted on a same physical host are associated with different CSIs of a same SI. The method further generates a third portion of the configuration that configures the SUs of different SGs such that each SU is hosted by any one VM on the same physical host, while the different SUs of a same SG are mapped to the VMs hosted on different physical hosts. The configuration enables the AMF to manage an application formed by the SGs in a virtualized environment in a same way as in a non-virtualized environment without modification to the application.

According to another embodiment, a computer system is provided to generate a configuration for a highly available system to enable AMF to manage a plurality of VMs and support hardware redundancy for each of a plurality of SGs. Each SG includes a plurality of SUs, and each SU is a unit of redundancy for services provided and protected by an SG. The system comprises memory to store configuration attributes, and one or more processors coupled to the memory. The one or more processors is adapted to generate a first portion of the configuration according to a redundancy model and the configuration attributes, wherein the first portion of the configuration configures a set of SIs to represent workload, wherein each SI contains a set of CSIs and each CSI represents one or more of the VMs to be managed by AMF; generate a second portion of the configuration that sets the configuration attributes to associate each VM to one of the CSIs, such that the VMs to be hosted on a same physical host are associated with different CSIs of a same SI; and generate a third portion of the configuration that configures the SUs of different SGs such that each SU is hosted by any one VM on the same physical host, while the different SUs of a same SG are mapped to the VMs hosted on different physical hosts. The configuration enables the AMF to manage an application that is formed by the SGs and runs on the VMs in a same way as in a non-virtualized environment without modification to the application.

According to yet another embodiment, a system is provided for generating a configuration for a highly available system to enable AMF to manage a plurality of VMs and support hardware redundancy for each of a plurality of SGs. Each SG includes a plurality of SUs, and each SU is a unit of redundancy for services provided and protected by an SG. The system comprises a first generation module configured to generate a first portion of the configuration according to a redundancy model and the configuration attributes, wherein the first portion of the configuration configures a set of SIs to represent workload, wherein each SI contains a set of CSIs and each CSI represents one or more of the VMs to be managed by AMF; a second generation module configured to generate a second portion of the configuration that sets the configuration attributes to associate each VM to one of the CSIs, such that the VMs to be hosted on a same physical host are associated with different CSIs of a same SI; and a third generation module configured to generate a third portion of the configuration that configures the SUs of different SGs such that each SU is hosted by any one VM on the same physical host, while the different SUs of a same SG are mapped to the VMs hosted on different physical hosts. The configuration enables the AMF to manage an application that is formed by the SGs and runs on the VMs in a same way as in a non-virtualized environment without modification to the application.

According to yet another embodiment, a method is provided for managing service availability of a highly available system that is to run on a set of physical nodes, the method comprising the steps of modeling the physical nodes as a first cluster of an AMF configuration; modeling VMs hosted on the physical nodes as a second cluster of the AMF configuration, wherein the VMs are adapted to execute one or more application components of the highly available system; and managing the first cluster with a first AMF instance and the second cluster with a second AMF instance, wherein the first AMF instance and the second AMF instance operate independently.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The SA Forum has defined a set of middleware service Application Programming Interfaces (APIs) that can be used to implement portable applications to provide highly available services. The Availability Management Framework (AMF) is responsible for maintaining the availability of the services that the system provides by managing the system resources. The services and the resources of the system are described in an information model, a subset of which is used to configure AMF that is referred as the AMF configuration. Using this information, an AMF implementation manages the life-cycle of the configured resources (e.g., components) and their service assignments so that the services are highly available.

Figure 1:
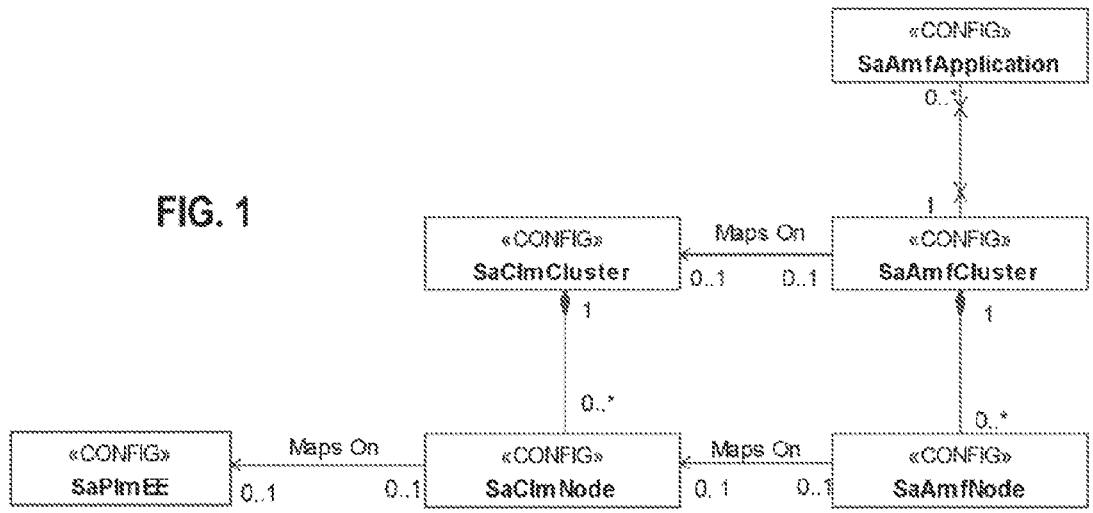
FIG. 1 illustrates a system information model according to one embodiment of the invention.

The components executing on the same operating system instance form an AMF node. These components are mapped through the AMF node to a node of Cluster Membership service (CLM), and, in turn, mapped to an execution environment (EE) of the Platform Management service (PLM) representing the operating system instance in the information model as shown in FIG. 1 according to one embodiment. The CLM nodes form the CLM cluster, which hosts an AMF cluster, which is the collection of AMF nodes. In the description herein, it is assumed that the CLM cluster and the AMF cluster are equivalent; i.e., there is a one-to-one mapping between the CLM nodes and the AMF nodes. It is noted that a CLM node and an AMF node are logical nodes, which are distinguished from physical nodes (also referred to as physical hosts) on which the logical nodes are executed.

Figure 2:
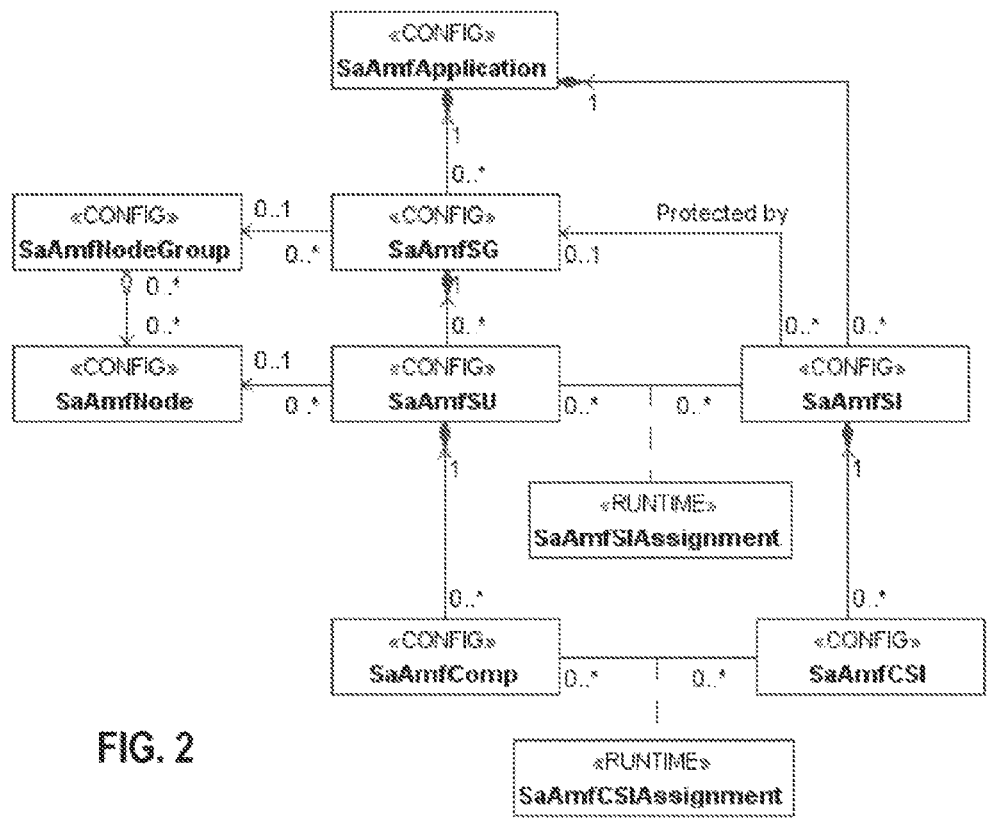
FIG. 2 illustrates a class diagram of AMF entities and the relationship among them according to one embodiment.

FIG. 2 illustrates a diagram of AMF entities and the relationship among them according to one embodiment. For the purpose of availability management, an AMF application is perceived as a set of service groups (SGs), each of which provides and protects some services represented as service instances (SIs). An SG is a redundant set of service units (SUs), each of which is composed of one or more components (e.g., OS processes, hardware resources, etc.) to provide the associated SIs. The specification does not define what a component represents. Each SI can be assigned at runtime to one or more SUs. A portion of a workload assigned on behalf of an SI to a component within the SU is referred to as a component service instance (CSI).

At runtime an AMF implementation instantiates the different SUs by instantiating their components according to an AMF configuration. Different SUs of an SG are typically configured for different CLM nodes so that a failing node takes out of service only one SU of an SG. Alternatively, the configuration may indicate a set of nodes that are eligible to host the SU, and AMF selects one of the nodes when it instantiates the SU for the first time.

For each of the SIs and its CSIs AMF manages at runtime the role assignments (e.g., active or standby) of the redundant components according to the redundancy model configured for the SG. AMF also perform the related "housekeeping" tasks: it continuously monitors the status of the components and adjusts their assignments as necessary to guarantee the service availability.

AMF may interact with the components by using the AMF Application Programming Interface (API). A component implementing the AMF API is called an SA-aware component. AMF also allows the integration of components that do not implement the AMF API, components that run in a different execution environment, and/or components outside the AMF cluster.

The simplest integration with AMF is for a component to have a configuration that allows AMF to control its life-cycle through the component life-cycle Command Line Interface (CLI) and detect its errors. These components are called non-SA-aware-non-proxied components.

A proxied component may execute outside the cluster. Whether a proxied component is inside or outside the cluster, it interacts with AMF through a proxy component, which is an SA-aware component mediating the life-cycle management and the API interactions of AMF.

A contained component runs in a special environment within the cluster, which is provided by a container component. The contained component is considered as an SA-aware component except for its life-cycle management. AMF uses the container component to manage the contained component's life-cycle. The life-cycles of a container and its contained components are tied together since the container provides the special environment in which the contained components run. As a result, it is assumed that all contained components die with their container. Thus, the semantics of container components is similar to the semantics of VMs. It is noted that the container concept was designed with the Java Virtual Machine in mind.

If a VM is static and has been integrated with AMF, the VM can be mapped to a container component. In this scenario, the applications running in the VM are not SA-aware (i.e., cannot directly communicate with AMF) but communicate with AMF through the VM. That is, the SA Forum middleware does not run within the VM and the applications do not link with the middleware. However, in some scenarios, the applications running in the VMs are written to interact directly with AMF without a container. In this case, the applications expect that AMF runs also within the VM, which means that AMF has access to their execution environment without the need for a container component. Furthermore, a container component cannot migrate among physical hosts.

Considering host virtualization, SAF introduced PLM which represents the virtualization facilities (VM and VMM) and the operating system using the same logical entity—EE. PLM represents the hardware by the hardware element (HE) logical entity. PLM is expected to detect and report the status changes of its entities to its users including CLM (and therefore indirectly to AMF). A PLM configuration provides the information about the hardware boundaries for static VMs. If VM migration or failover is considered, PLM can be modified to provide the distribution of VMs on the hardware at runtime. Hardware separation of the active and standby assignments at the AMF level can be ensured by interrelating the AMF and PLM configurations.

However, using PLM to represent the virtualization facilities is suitable for static VMs. With VM migration and failover, other complementary solutions are needed. Furthermore, the PLM specification does not expect a PLM implementation to manage the availability of its entities or their services.

Embodiments of the invention use AMF to manage the availability of VMs instead of the availability solutions at the virtualization level. Managing both the availability of the VMs and the applications by AMF allows a uniform solution for all of the layers in a highly available system. Using AMF for VM management makes it a vendor-independent and standard-based solution. According to the embodiments, applications are managed by AMF natively; that is, the applications have already been integrated with AMF for non-virtualized deployment and can be deployed on the VMs without modification. That is, the same application implementation can be used in a virtualized deployment as in a non-virtualized deployment.

By contrast, in the availability solutions at the virtualization level, the applications are not managed by AMF; i.e., the applications are not integrated with AMF. Instead, redundancy is deployed at the VM level, and the whole VM is replicated to protect the applications' services. The VM availability management is not aware of the applications; hence it does not detect failures on the applications and does not manage their life-cycles.

For AMF to manage the virtualization facilities, in one embodiment, the virtualization facilities are first mapped into the AMF logical entities of components and component service instances (CSIs), and described in an AMF configuration. Embodiments of the invention provide a number of mapping options between the virtualization facilities and the AMF entities, and the choice of a mapping option depends on the characteristics of the virtualization and the applications.

Embodiments of the invention also provide the redundancy model configurations for supporting hardware redundancy between the virtualization layer and the entities hosted in the VMs. Furthermore, through the configuration of SGs, the relation between the components representing the applications and those components/CSIs representing the virtualization facilities can be defined.

In one embodiment, a migration-enabled VM (as well as a static VM) is viewed as the service provided by the virtualization facilities and is mapped to a CSI. A CSI can be assigned by AMF to different components; therefore, a CSI migrates as part of its nature. Usually, a set of redundant components are configured so that AMF can select the most appropriate component for the CSI assignment at any moment during runtime. In this respect, it is the VMM (also referred to as a hypervisor) which can be assigned to run a VM. Thus, in one embodiment, a VMM has a role that maps to a component.

When the VMM is hosted on or integrated with an operating system, the AMF implementation running on the same OS can manage the life-cycle of the VMM by starting and stopping it. The VMM can stay idle if it has no VM to run, or it can run the VMs assigned to it. Thus, a VMM or part of the VMM can be a pre-instantiable component. Representing only a part of the VMM as a component may limit the scope of impact when that component is restarted due to a failure (e.g., restarting the VMM and all of its VMs vs. restarting a part of the VMM and only a subset of the VMs). If the VMM does not implement the AMF API, the VM can interact with AMF via a wrapper or proxy component.

Regardless of the mechanism through which the VMM interacts with the AMF, AMF can manage the VMs represented as CSIs through managing the VMMs as components to which these CSIs can be assigned. An active monitor can be used to monitor the VMM and report any error to AMF. In addition, if the VMM has a wrapper to turn it into an SA-aware component, AMF can monitor the health of the VMM by monitoring the registered wrapper. If the VMM is proxied, then the proxy may monitor the health of the VMM, or the proxy can provide AMF with the process ID of the VMM for AMF to monitor the VMM. In these cases, the VMMs run together with the AMF implementation, and the SAF middleware forms the cluster for the availability management.

If the VMM is a bare-metal hypervisor, then it does not run within the same cluster as AMF does, and can only be a proxied component. Its health can be monitored by the proxy or through an active monitor. In case of such an external proxied component, AMF does not know anything about the location of the proxied component, so the AMF availability management functionality is exported through the proxy. In this case, AMF can also manage the VMs represented as CSIs through managing the VMMs as components to which these CSIs can be assigned.

In all of the above cases the CSI may have both active and standby assignments. That is, standby VMs can also be managed by AMF, provided that the VMM exposes such option to AMF. The VMM components can be configured to accept assignments as requested.

In addition to the management option described above when a VMM is integrated through a wrapper or a proxy, a VMM may have an interface (e.g., libvirt or a similar interface) that allows it to receive CLI commands for controlling the VMs. When a local (i.e., within the cluster) component is configured for AMF and the CLI commands are provided to instantiate, terminate and cleanup this component, AMF can control that component regardless whether the component runs locally or externally (i.e. within the VMM, of which AMF is not aware).

In one embodiment, component life-cycle CLI commands may be defined for an "imaginary component," which is a non-SA-aware-non-proxied component. The life-cycle of such a component coincides with its CSI assignment. Therefore, the component life-cycle CLI commands can be used to configure such a component to start and stop the VM mapped to the CSI provided by the component. Such a component is non-preinstantiable from AMF's perspective. It needs to be configured for AMF; i.e., the configuration specifies the component name and the CLI commands. In one embodiment, three CLI commands are given: the instantiate command that starts the VM identified by a CSI, the terminate command that stops the started VM, and the cleanup command that kills a VM and cleans it up.

In this case there is no need for a "tangible" component as AMF cannot monitor the component itself without being told what to monitor. So instead of monitoring this imaginary component, AMF can be asked to monitor the process ID of the VM started, or it can start together with the component an active monitor, which may interact for example with the VMM to assess the VM's health. The capability model of the imaginary component is "non-preinstantiable;" however, it is not associated with and therefore not limiting the number of VMs a VMM can run. In this case, the VMM is not represented in the AMF configuration, and can be anywhere as long as AMF can start and stop the VMs using the CLI commands.

When component life-cycle CLI commands are used for VM life-cycle management, a CSI may only have active assignment. However, the CSI can have one or multiple active assignments depending on the redundancy model used to protect it. If it has a single assignment then the CSI is associated with a single VM, which can be started, stopped, migrated or failed over through this single active CSI assignment.

If the CSI is configured to have multiple active assignments, the CSI identifies a group of VMs instead of the VM instance. The VMMs is to be configured to resolve the identity of the VM, each will run as a result of the assignment, i.e., the execution of the instantiate CLI command. For example, the CSI can be associated with a VM template, which describes the attributes of the group of VM instances and is tailored for each instance by the virtualization facilities.

Whether the VMs are integrated with AMF through preinstantiable or non-preinstantiable components, the solutions described herein do not imply any assumption about the entities running inside of the VMs except that they are not contained components. For AMF the life-cycle of these entities is not coupled with the life-cycle of any other component in the system. In reality, however, the life-cycle of these entities is coupled with the VMs.

The AMF concept besides the container that ties the life-cycle of the components running inside the VMs to their environment is the AMF node. This AMF node concept coincides with the CLM view that a CLM node maps to an OS instance at the PLM level. Thus, a VM can be mapped into an AMF node from the perspective of the entities running inside of the VM.

To guarantee hardware redundancy for the entities running within the VMs, the components providing the VMs represented as CSIs are to be configured in an SG where there is only one SU per physical host for the SG. That is, the components (whether preinstantiable or non-preinstantiable) follow the AMF paradigm of redundancy; i.e., components that provide and protect the same VM or a VM template are organized into different SUs of the same SG. Hardware redundancy is guaranteed when only a single SU of an SG is configured on a physical node.

It is noted that AMF allows the configuration of more than one SUs of an SG on the same physical node; however, this scenario does not guarantee hardware redundancy but it can be used to provide at least software redundancy for the SIs. For example, under the No-redundancy redundancy model if there are 10 physical nodes (each hosting an SU) and 10 SIs, each SI is assigned to a different SU on a different physical node. When one physical node fails if there is no second SU on any of the remaining physical nodes, then one SI will not be assigned. If there are two SUs on each physical node, that one SI and another SI will be assigned to the two SUs on a physical node. In this scenario, at least the SIs are provided and protected by software redundancy. In one embodiment, the SUs can be ranked such that AMF will instantiate these doubled up SUs only if there are not enough physical nodes. In the following description, hardware redundancy is considered for various redundancy models.

In FIGS. 3-6 below, examples of the mapping between SGs and VMs are shown. The VMs are represented by CSIs and these CSIs are assigned to the components of the SUs in the physical nodes according to a redundancy model and configuration attributes. The choice of the redundancy model may be based on the requested features of the VMs and/or system features; e.g., whether there is a need to distinguish each VM, whether standbys are necessary and other requested features. In these examples, the SGs in the same example follow the same redundancy model. It is noted that there can be different sets of VMs for which different redundancy models are chosen.

Figure 3:
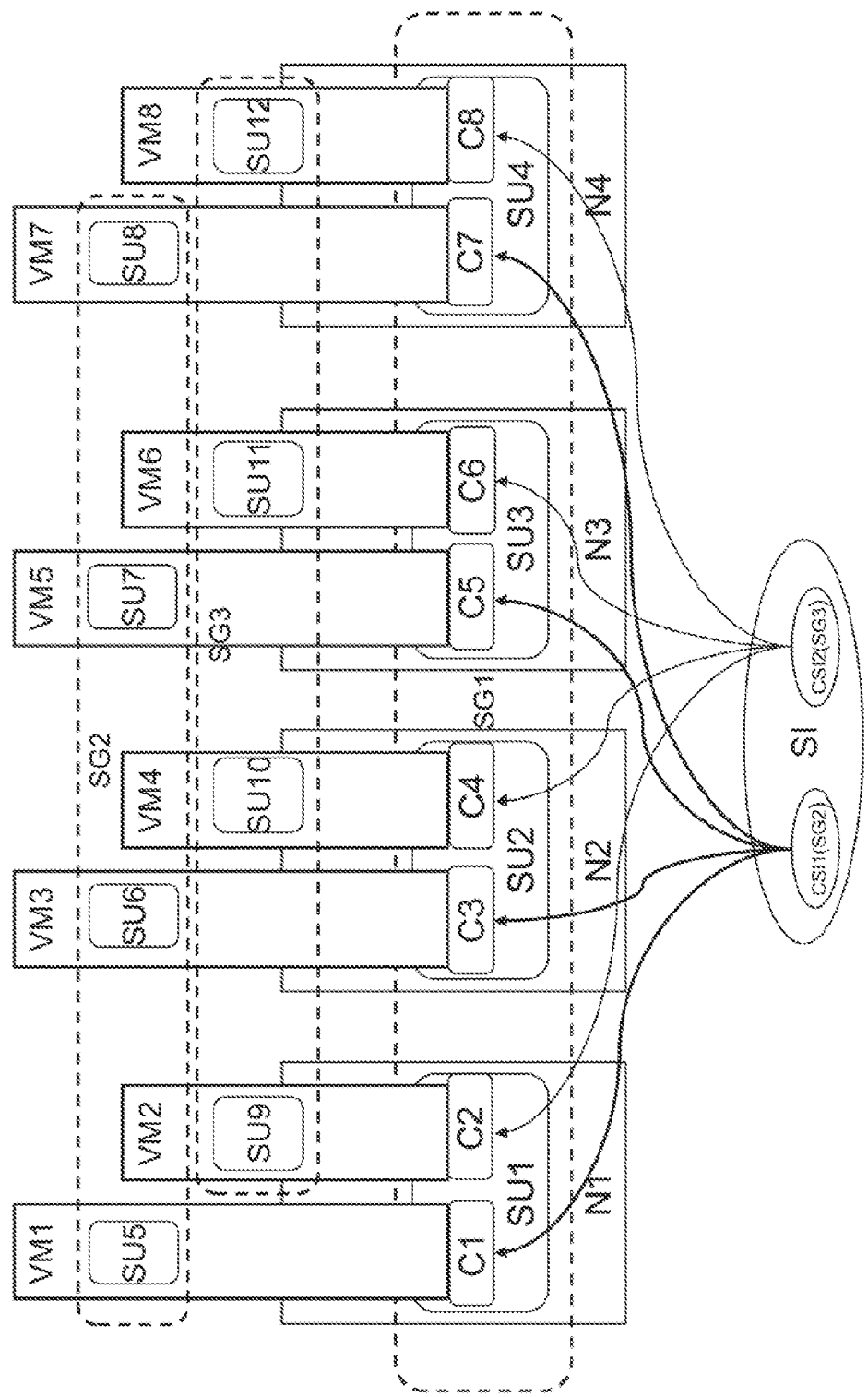
FIG. 3 illustrates an example of hardware redundancy through the N-way-active redundancy model according to one embodiment.
Figure 4:
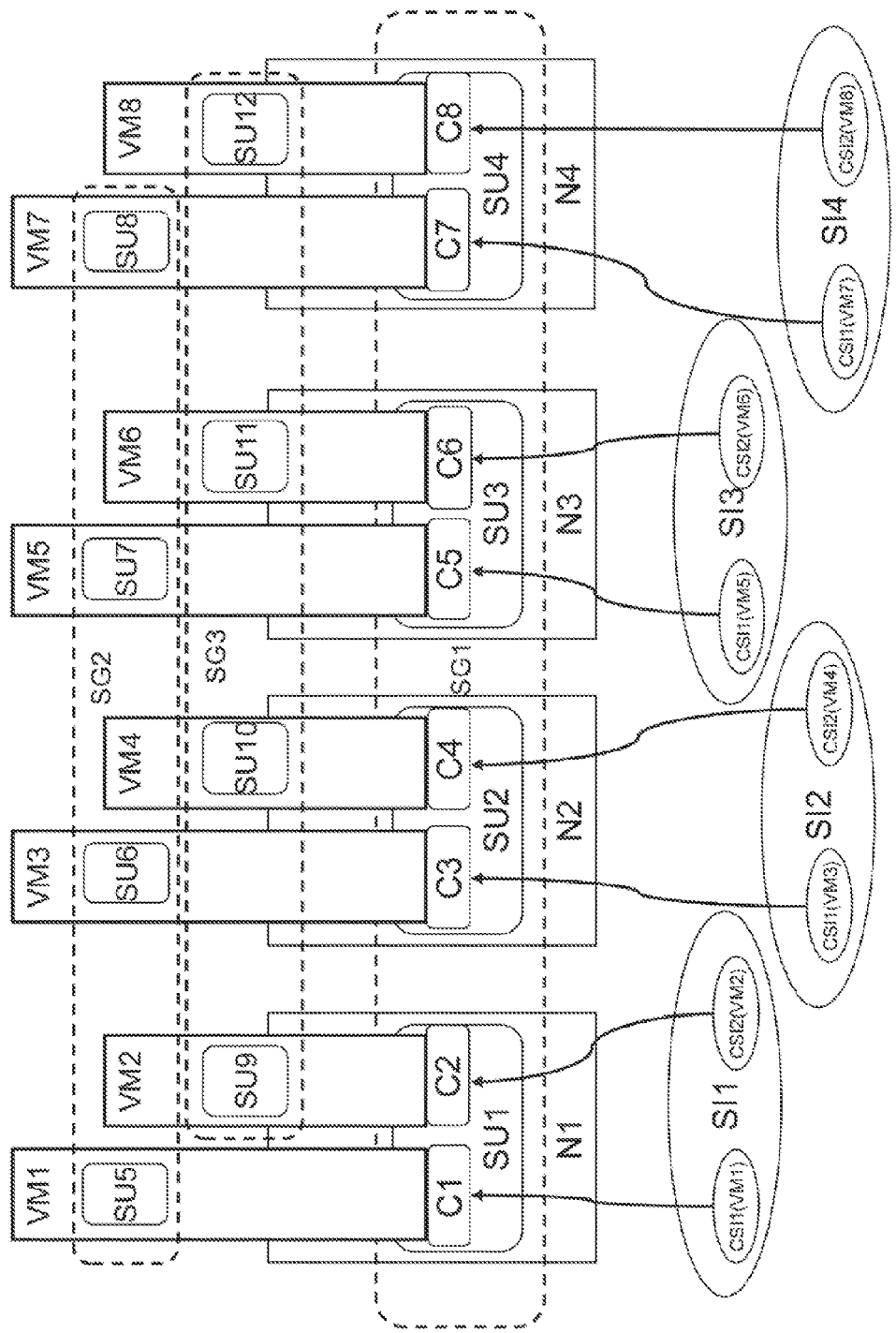
FIG. 4 illustrates an example of hardware redundancy through the No-redundancy redundancy model according to one embodiment.
Figure 5:
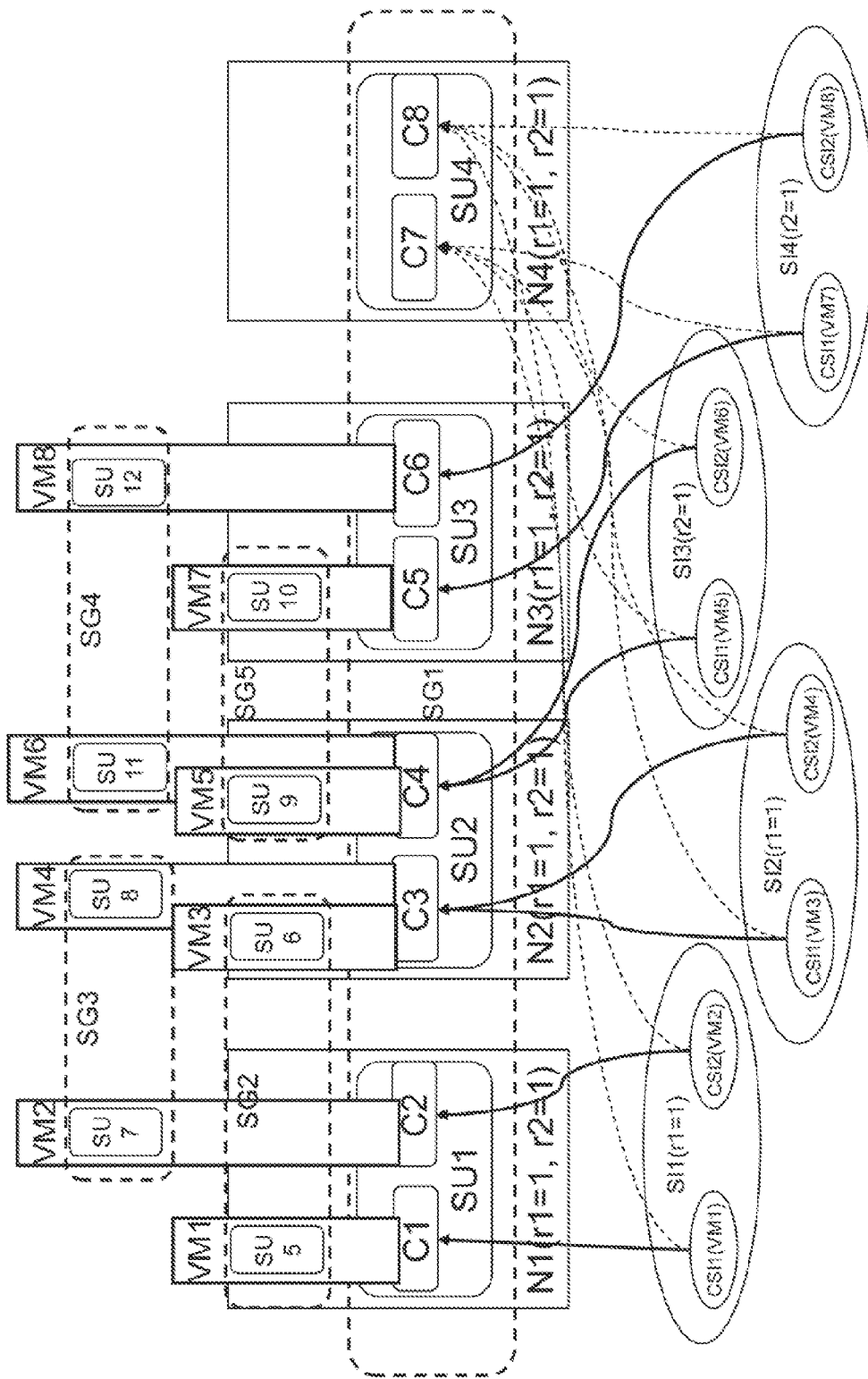
FIG. 5 illustrates an example of hardware redundancy through the N+M redundancy model according to one embodiment.
Figure 6:
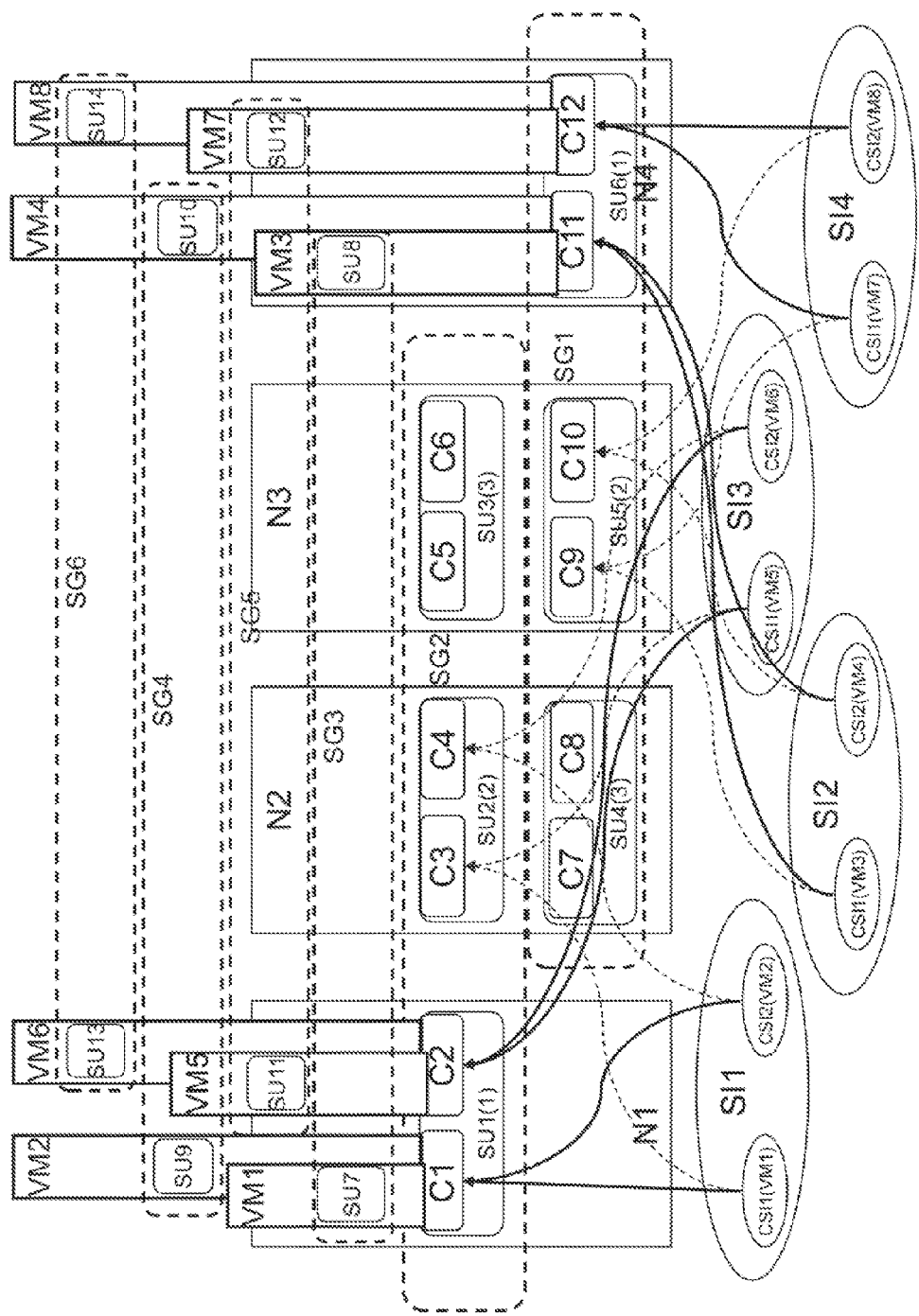
FIG. 6 illustrates an example of hardware redundancy through the 2N redundancy model according to one embodiment.

In FIGS. 3-6, the SIs represent the workload that the VMs put on the physical hosts. In one embodiment, components (C1-C8) may be created (e.g., as "imaginary components") for the sake of the configuration to receive CSI assignments. FIGS. 4-6 show in parenthesis the attribute of each CSI that indicates the VM represented by the CSI. For the N-way-active redundancy of FIG. 3, since the CSI does not identify a VM instance among its corresponding group of VMs, each CSI indicates the SG for which the SUs are configured on the corresponding VMs.

FIG. 3 illustrates an example of hardware redundancy through the N-way-active redundancy model according to one embodiment. As shown in FIG. 3, the N-way-active redundancy model guarantees that each assignment of the SI is assigned to an SU on a different physical host. Thus, for the VMs (e.g., VM1, VM3, VM5, VM7) provided through a given CSI (e.g., CSI1) of such an SI, the hardware redundancy is guaranteed and these VMs can be used to host different SUs of the same SG (e.g., SG2) from the perspective of the entities hosted in the VMs. Each CSI of the SI can be used to provide such a group of VMs. While the VMs (e.g., VM1 and VM2) provided through different CSIs (e.g., CSI1 and CSI2) of the same SI are collocated on the same physical host. Thus, each CSI provides a node group that can host SUs of an SG and provide the same hardware redundancy guarantee as the CSI assignments have in the SG protecting them.

FIG. 4 illustrates an example of hardware redundancy through the No-redundancy redundancy model according to one embodiment. According to this redundancy model, if each VM is provided through a different CSI, only a CSI of another SI can provide a VM hosted on another physical node. The only redundancy model that guarantees that SIs are assigned to different SUs is the No-redundancy redundancy model, when the number of SUs is at least the same as the number of SIs.

FIG. 4 shows SU1, SU2, SU3 and SU4 are SUs of SG1 configured with the No-redundancy redundancy model. These SUs protect SI1, SI2, SI3 and SI4 each with two CSIs (CSI1 and CSI2). CSI1 is associated with the VMs that can host SUs for the same SG (SG2), and the same applies to the VMs associated with CSI2 and SG3. Furthermore, CSIs of the same SI provide collocated VMs. In this example, CSI1 and CSI2 of SI1 provide VM1 and VM2, which are collocated on physical host N1.

Both redundancy models of FIG. 3 and FIG. 4 support only active assignments. In the other redundancy models with standby assignments, each SI has a single active assignment and it is given to an SU and therefore in this respect they are similar to the No-redundancy redundancy model of FIG. 4. However, the redundancy models with standby assignments may assign multiple SIs to the same SU and therefore the hardware separation for the entities within the VMs of these SIs cannot be guaranteed. Since the 2N redundancy model puts all the active assignments on one SU (per SG), it cannot be used in the context of a single SG. The N+M and N-way redundancy models allow more than one SI assignment per SU; therefore, to ensure hardware redundancy, these two redundancy models are limited through configuration attributes to maximum one active assignment per SU. The diagram of these two redundancy models with one active assignment per SU is the same as the diagram of FIG. 4.

An alternative to limiting the number of active assignments of the SUs is to use the SI weight and (physical) node capacity to guarantee the hardware redundancy for the VMs that host SUs of the same SG. FIG. 5 illustrates an example of hardware redundancy through the N+M redundancy model according to one embodiment. In this embodiment, the SI weight and node capacity attributes can be used to ensure that each node (of a group of physical nodes providing redundant VMs) has capacity only for a single SI for each SG. A physical node (e.g., N2) may provide capacity for multiple SIs (e.g., 512 and SI3) that participate in different sets of redundant nodes. In this example, all nodes have two resources: one r1 (i.e., r1=1) and one r2 (i.e., r2=1), meaning that each node may be assigned an SI using resource r1 and another SI using r2. Since SI1 and SI2 both use one resource r1, they exclude each other on a node. Hence, hardware redundancy is guaranteed for the VMs that the SIs (SI1 and SI2) provide through their CSIs, i.e., for VM1 and VM3 as well as for VM2 and VM4. The same is true for SI3 and SI4 with respect to resource r2. Alternatively, SI3 can be collocated with SI1 as they use different resources; accordingly, SI1 and SI3 cannot be used together to provide hardware redundancy in the hosted VMs.

In each of the SGs (SG2, SG3, SG4 and SG5), there are two SUs, which need to be located on different hardware. This is guaranteed through the same resource that different physical nodes can provide, but each only for one SI. Accordingly, the VMs hosting these SUs need to be mapped into SIs competing for this same resource. These competing SIs will not be assigned to the same physical node needing the same resource. As a result, the VMs mapped into the SIs and the SUs on the VMs will not be collocated on the same physical node. For example, the SUs of SG2 are hosted on the VMs (VM1 and VM3) provided through SI1 and SI2, both competing for resource r1. The number of resources defined for each physical host is equal to the number of disjoint VM groups.

Since the standby assignments do not provide service, there are no VMs associated with the standbys in the system. In the example of FIG. 5, SU4 does not provide any VM. In case of an SU failure, SU4 gets all the assignments that the failed SU had.

FIG. 6 illustrates an example of hardware redundancy through the 2N redundancy model according to one embodiment. Similar arrangements can be achieved using multiple SGs and ranking as shown in the example of FIG. 6. In this example, the 2N redundancy model, puts all the active assignments on one SU per SG. SIs that map to the VMs used for the same SG hosted in the VMs are protected by different SGs. However, the ranks of the SUs (as shown in the parenthesis next to each SU) are set so that the SUs of different physical nodes are favored for the SI assignments. In the example of FIG. 6, SG2 includes SU1(1), SU2(2) and SU3(3), and SG1 includes SU4(3), SU5(2) and SU6(1), where the SU with rank one (e.g., SU(1) and SU4(1)) is the highest and most preferred, and the SU with rank three (e.g., SU3(3) and SU4(3)) is the lowest and least preferred. In the example of SG2, SU1 is the most preferred SU in SG2 and SU3 is the least preferred. In SG1 it is the opposite: SU4 is the least preferred while SU6 is the most preferred. As a result, the assignments are given to SU1 in SG2 and to SU6 in SG1. Since SI1 and SI2 provide VMs that are used in the same SGs SG3 and SG4), they are protected by different SGs; SI1 is protected by SG2 and SI2 by SG1. The ranking guarantees that as long as there are enough physical nodes available for the SGs (i.e., SG1 and SG2), the SIs are assigned to different nodes. When there are not enough physical nodes available for the SGs, the SIs are still provided but without guaranteeing hardware redundancy. In the example if only N2 is available, all the SIs will be assigned to the SUs hosted on it (SU2 of SG2 and SU4 of SG1).

It is noted that the standby assignments for the VMs may interfere with the protection implemented within the VMs.

It is also noted that in FIGS. 3-6, the number of SIs and their CSIs are determined based on the workload that is to be processed. As AMF performs the assignment of SIs to SUs, one can only influence or guide the assignments through configuration attributes such as SU rank, SI-SU rank, node capacity, SI weight, etc. Furthermore, the configuration may be driven by the needs of the applications running inside the VMs, e.g., based on the SGs and their SUs, it can be determined how many VMs are needed, how the VMs are to map into SIs and CSIs, and what redundancy model is to be used. However, as mentioned above, the assignments are given by AMF. Therefore, an AMF configuration may specify the attributes that constrain the distribution of the assignments but it may not specify the assignments distribution itself.

Since the VMs are mapped to AMF and CLM nodes, one question is what cluster they form. If the VMs run the same middleware implementation as the middleware outside managing the VMs, then these VMs can join the same cluster within which they are provided. Since the VMs are not containers, AMF does not know about the dependency between the nodes that represent the VMs and the CSIs through which they are being managed. For AMF these nodes are simply late in joining the cluster. Late-joining nodes are not a problem as AMF does not impose that all cluster nodes are present at all times. However, the cluster startup time needs to be long enough for the initial/physical nodes to come up, after which AMF starts to distribute the assignments for the CSIs so that the nodes of the VMs can also come up. The order in which these VMs start can be controlled by establishing dependencies between the SIs through which the VMs are provided.

Figure 7:
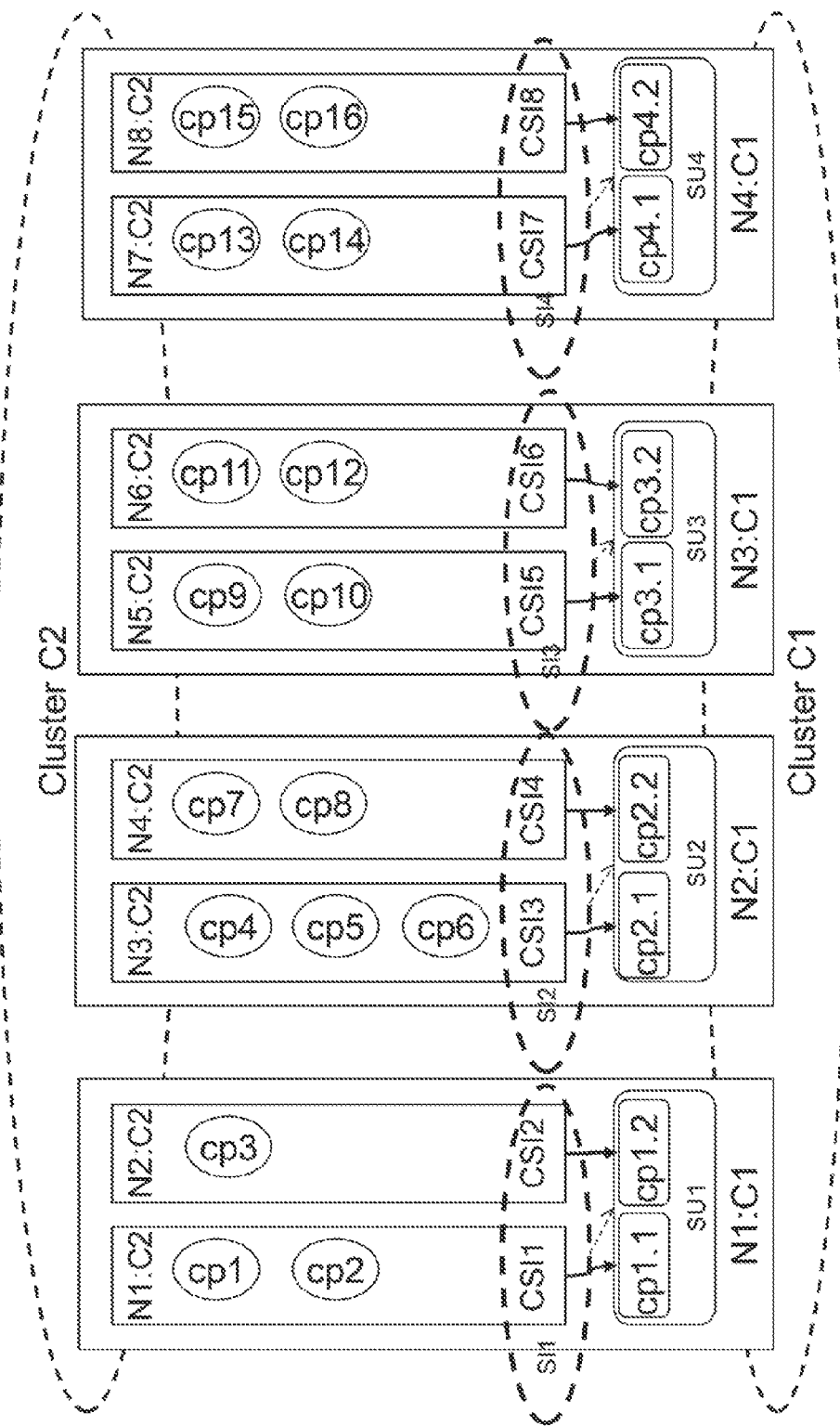
FIG. 7 illustrates an example of a first cluster managing the VMs that form a second cluster which runs application components according to one embodiment of the invention.

FIG. 7 illustrates an alternative configuration in which two (or more) different clusters are formed by the hosted VMs. In FIG. 7, "C" stands for "cluster" and "c p" stands for "component" In the first cluster (Cluster C1), AMF manages the SIs and CSIs associated with the VMs, as well as the SUs and components providing them. The example shows SU1-SU4 and their components (cp1.1 and cp1.2 in SU1, cp2.1 and cp2.2 in SU2, cp3.1 and cp3.2 in SU3, and cp4.1 and cp4.2 in SU4), which are assigned at runtime to CSI1-CSI8. Each of the CSIs represents a VM.

In this example, SU1-SU4 are hosted on physical nodes N1-N4:C1, which form the first cluster. The VMs themselves map to CLM nodes and are represented by N1-N8:C2. These VMs form the second cluster (Cluster C2). Both N1-N4:C1 and N1-N8:C2 are CLM nodes as well as AMF nodes. In the second cluster, an independent AMF instance manages the applications components cp1-cp16 running in the VMs without being aware of the first cluster. That is, the nodes of the first cluster N1-N4:C1 are not visible in the second cluster. The first cluster is also not aware of the second cluster.

Whether the VMs join the same cluster as the physical nodes that host them or a different cluster, it is important that the components, SUs and the like hosted on the VMs are configured for the nodes that represent these VMs. They are not part of the CSI/SI assignment. In other words, the CSI assignment representing a VM only implies the VM image but not the components. For example, N1:C2 represented by CSI1 implies the software necessary to run cp1 and cp2, but it does not imply the instantiation of cp1 and cp2. These components will be instantiated by the AMF managing them whenever AMF deems it necessary. AMF has the option of instantiating cp1 on another VM, whose image includes the necessary software.

Figure 8A:
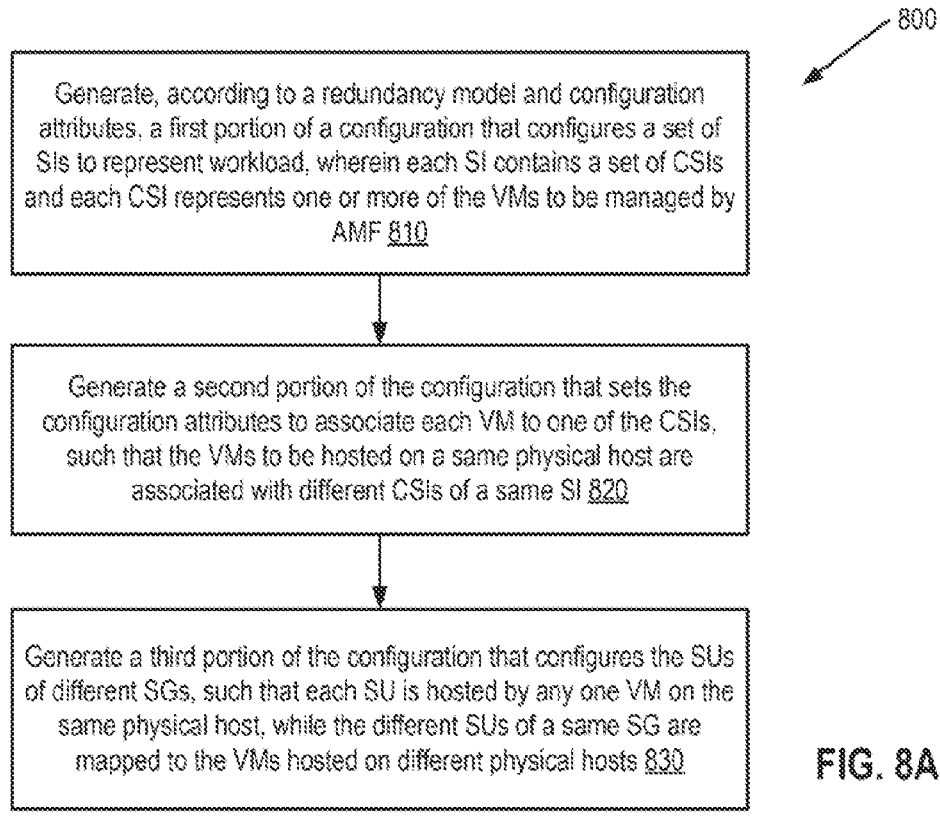
FIG. 8A is a flow diagram illustrating a method for generating a configuration according to one embodiment of the invention.

FIG. 8A is a flow diagram illustrating a method 800 for generating an AMF configuration that enables AMF to manage a plurality of VMs and support hardware redundancy for each of a plurality of SGs. Each SG includes a plurality of SUs, and each SU is a unit of redundancy for services provided and protected by an SG.

In one embodiment, the method 800 begins with generating, according to a redundancy model and configuration attributes, a first portion of a configuration that configures a set of SIs to represent workload, wherein each SI contains a set of CSIs and each CSI represents one or more of the VMs (810) to be managed by AMF. The method 800 further generates a second portion of the configuration that sets the configuration attributes to associate or bind each VM with one of the CSIs, such that the VMs to be hosted on a same physical host are associated with different CSIs of a same SI (820). The method 800 further generates a third portion of the configuration that configures the SUs of different SGs such that each SU is hosted by any one VM on the same physical host, while the different SUs of a same SG are mapped to the VMs hosted on different physical hosts (830). The configuration enables the AMF to manage an application formed by the SGs in a virtualized environment in a same way as in a non-virtualized environment without modification to the application.

Figure 8B:
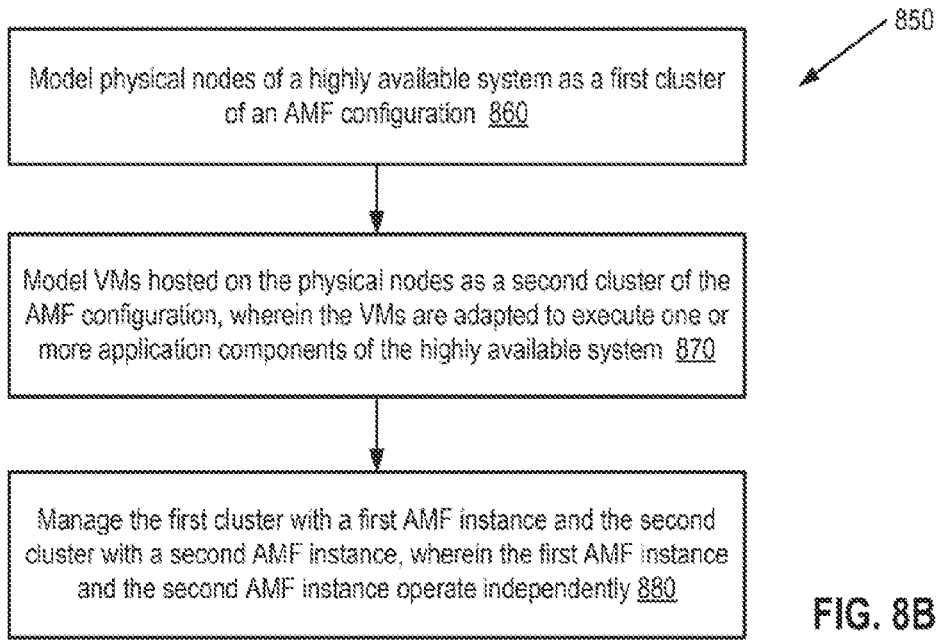
FIG. 8B is a flow diagram illustrating a method for manages service availability according to one embodiment of the invention.

FIG. 8B is a flow diagram illustrating a method 850 for managing service availability of a highly available system that is to run on a set of physical nodes. The method begins with modeling the physical nodes as a first cluster of an AMF configuration (860). The method further models VMs hosted on the physical nodes as a second cluster of the AMF configuration, wherein the VMs are adapted to execute one or more application components of the highly available system (870). The first cluster is managed with a first AMF instance and the second cluster is managed with a second AMF instance, wherein the first AMF instance and the second AMF instance operate independently (880).

The methods 800 and 850 may be performed by hardware (e.g., circuitry, dedicated logic, programmable logic, microcode, etc.), software (e.g., instructions run on a processing device), or a combination thereof. In one embodiment, the methods 800 and/or 850 may be performed by a system 900 of FIG. 9 and/or by a computer system 1000 of FIG. 10.

Figure 9:
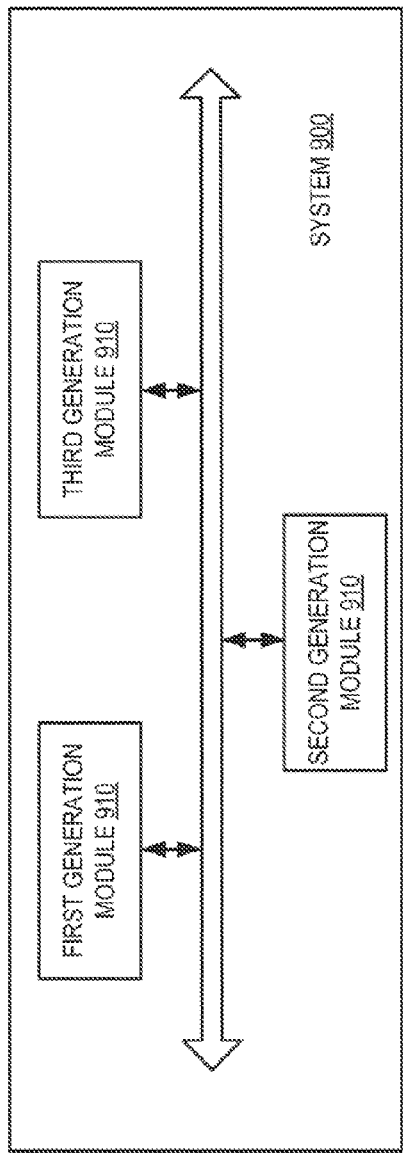
FIG. 9 illustrates a diagrammatic representation of a system for generating a configuration according to one embodiment of the invention.

FIG. 9 illustrates a configuration generator system 900 for generating a configuration according to one embodiment. In one embodiment, the system 900 performs the method 800 of FIG. 8.

The system 900 comprises a first generation module 910 configured to generate a first portion of the configuration according to a redundancy model and configuration attributes, wherein the first portion of the configuration configures a set of SIs to represent workload, wherein each SI contains a set of CSIs and each CSI represents one or more of the VMs to be managed by AMF, a second generation module 920 configured to generate a second portion of the configuration that sets the configuration attributes to associate each VM to one of the CSIs, such that the VMs to be hosted on a same physical host are associated with different CSIs of a same SI, and a third generation module 930 configured to generate a third portion of the configuration that configures the SUs of different SGs such that each SU is hosted by any one VM on the same physical host, while the different SUs of a same SG are mapped to the VMs hosted on different physical hosts, thereby the configuration enabling the AMF to manage an application that is formed by the SGs and runs on the VMs in a same way as in a non-virtualized environment without modification to the application.

Figure 10:
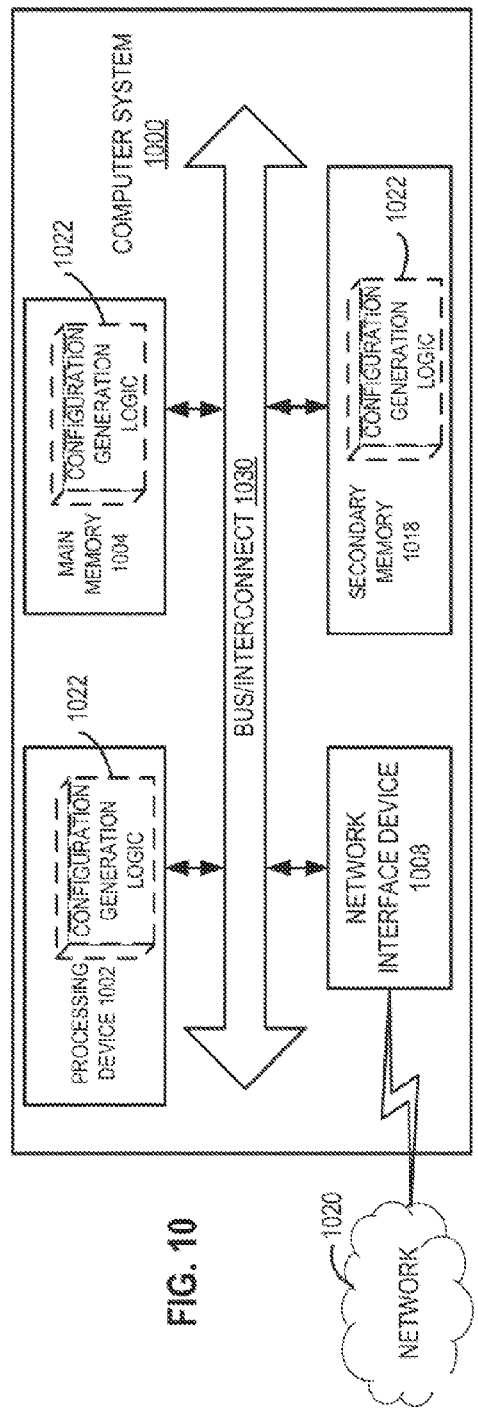
FIG. 10 illustrates a diagrammatic representation of a computer system according to one embodiment of the invention.

FIG. 10 illustrates a diagrammatic representation of a machine in the exemplary form of the computer system 1000 within which a set of instructions, for causing the machine to perform any one or more of the methodologies discussed herein, may be executed. In one embodiment, the computer system 1000 may be part of a network node (e.g., a router, switch, bridge, controller, base station, etc.). In one embodiment, the computer system 1000 may operate in a cloud computing environment where multiple server computers in one or more service centers collectively provide computing services on demand. The computer system 1000 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1000 includes a processing device 1002. The processing device 1002 represents one or more general-purpose processors, each of which can be: a microprocessor, a central processing unit (CPU), a multicore system, or the like. The processing device 1002 may also be one or more special-purpose processing devices such as an application specific integrated circuit (ASIC), a field programmable gate array (FPGA), a digital signal processor (DSP), network processor, or the like. In one embodiment, the processing device 1002 is adapted or operative to execute the operations of a configuration generation logic 1022 which contains instructions executable by the processing device 1002 to perform the method 800 of FIG. 8.

In one embodiment, the processor device 1002 is coupled to one or more memory devices such as: a main memory 1004 (e.g., read-only memory (ROM), flash memory, dynamic random access memory (DRAM), etc.), a secondary memory 1018 (e.g., a magnetic data storage device, an optical magnetic data storage device, etc.), and other forms of computer-readable media, which communicate with each other via a bus or interconnect 1030. The memory devices may also include different forms of read-only memories (ROMs), different forms of random access memories (RAMs), static random access memory (SRAM), or any type of media suitable for storing electronic instructions. In one embodiment, the memory devices may store the code and data of the configuration generation logic 1022. In the embodiment of FIG. 10, the configuration generation logic 1022 may be located in one or more of the locations shown as dotted boxes and labeled by the reference numeral 1022. In alternative embodiments the configuration generation logic 1022 may be located in other location(s) not shown in FIG. 10.

In one embodiment, the computer system 1000 is adapted or operative to perform the method 800 of FIG. 8 for generating a configuration for a highly available system to provide a service. In one embodiment, the processing device 1002, having one or more processors coupled to the memory devices that store configuration attributes, is adapted or operative to generate a first portion of the configuration according to a redundancy model and the configuration attributes, wherein the first portion of the configuration configures a set of SIs to represent workload, wherein each SI contains a set of CSIs and each CSI represents one or more of the VMs to be managed by AMF; generate a second portion of the configuration that sets the configuration attributes to associate each VM to one of the CSIs, such that the VMs to be hosted on a same physical host are associated with different CSIs of a same SI; and generate a third portion of the configuration that configures the SUs of different SGs such that each SU is hosted by any one VM on the same physical host, while the different SUs of a same SG are mapped to the VMs hosted on different physical hosts. The configuration enables the AMF to manage an application that is formed by the SGs and runs on the VMs in a same way as in a non-virtualized environment without modification to the application.

In another embodiment, the computer system 1000 is adapted or operative to perform a method for managing service availability of a highly available system that is to run on a set of physical nodes. The processing device 1002, having one or more processors coupled to the memory devices is adapted or operative to model the physical nodes as a first cluster of an AMF configuration; model VMs hosted on the physical nodes as a second cluster of the AMF configuration, wherein the VMs are adapted to execute one or more application components of the highly available system; and manage the first cluster with a first AMF instance and the second cluster with a second AMF instance, wherein the first AMF instance and the second AMF instance operate independently.

The computer system 1000 may further include a network interface device 1008. A part or all of the data and code of the configuration generation logic 1022 may be transmitted or received over a network 1020 via the network interface device 1008.

In one embodiment, the configuration generation logic 1022 can be implemented using code and data stored and executed on one or more computer systems (e.g., the computer system 1000). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system.

The operations of the flow diagrams of FIGS. 8A and 8B have been described with reference to the exemplary embodiments of FIGS. 9 and 10. However, it should be understood that the operations of the flow diagrams of FIGS. 8A and 8B can be performed by embodiments of the invention other than those discussed with reference to FIGS. 9 and 10, and the embodiments discussed with reference to FIGS. 9 and 10 can perform operations different than those discussed with reference to the flow diagram. While the flow diagrams of FIGS. 8A and 8B shows a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Accordingly, the specification and drawings are to be regarded in an illustrative sense rather than a restrictive sense.

What is claimed is:

1. A computer-implemented method for generating a configuration for a highly available system to enable Availability Management Framework (AMF) to manage a plurality of virtual machines (VMs) and an application hosted on the VMs, and to support hardware redundancy for each of a plurality of service groups (SGs) that form the application, wherein each SG includes a plurality of service units (SUs) which are units of redundancy for services provided and protected by the SG, the method comprising:
generating, by a computer system, a first portion of the configuration to configure a set of service instances (SIs) to represent workload that the VMs place on physical nodes, wherein each SI contains a set of component service instances (CSIs) and each CSI represents one or more of the VMs to be managed by the AMF;
generating a second portion of the configuration to associate each VM to one of the CSIs, such that the VMs to be hosted on a same physical host are associated with different CSIs; and
generating a third portion of the configuration to configure the SUs of different SGs such that each SU is hosted on one VM and different SUs of a same SG are hosted on the VMs hosted on different physical nodes, thereby the configuration enabling the AMF to manage the application hosted on the VMs without modification to the application as in a non-virtualized environment, wherein the AMF manages life-cycle and availability of the VMs through virtual machine monitors (VMMs) represented in the configuration as components.

2. The method of claim 1, wherein the VMs are migration-enabled such that during runtime each VM is migratable among the different physical nodes.

3. The method of claim 1, wherein the AMF further manages life-cycle and availability of each VM through component life-cycle command line interface (CLI) commands that are configured for the AMF to start, stop, and cleanup the VM.

4. The method of claim 1, further comprising:
creating a first cluster managed by a first instance of the AMF wherein the first cluster is formed by the physical nodes hosting the SUs and components providing the SIs and the CSIs associated with the VMs;
creating a second cluster managed by a second instance of the AMF wherein the second cluster is formed by the VMs, wherein the first instance and the second instance operate independently; and
generating the configuration including the first cluster and the second cluster.

5. The method of claim 1, further comprising: ranking the SUs such that the SUs on the different physical nodes are selected for the assignments of different SIs providing redundant VMs.

6. The method of claim 1, further comprising: setting an SI weight attribute and a node capacity attribute such that each physical node has capacity only for a single SI of a group of SIs providing redundant VMs.

7. The method of claim 1, wherein the VMs that host the SUs of the same SG are mapped to a same CSI of different SIs when a No-redundancy redundancy model is used.

8. The method of claim 1, wherein the VMs that host the SUs of the same SG are mapped to a same SI when an N-way-active redundancy model is used.

9. The method of claim 1, wherein the VMs form a same cluster as the physical nodes, the method further comprising: controlling an order in which the VMs start by establishing dependencies between the SIs through which the VMs are provided.

10. A system adapted to generate a configuration for a highly available system to enable Availability Management Framework (AMF) to manage a plurality of virtual machines (VMs) and an application hosted on the VMs, and to support hardware redundancy for each of a plurality of service groups (SGs) that form the application, wherein each SG includes a plurality of service units (SUs) which are units of redundancy for services provided and protected by the SG, the system comprising:
memory; and
one or more processors coupled to the memory, the one or more processors adapted to:
generate a first portion of the configuration to configure a set of service instances (SIs) to represent workload that the VMs place on physical nodes, wherein each SI contains a set of component service instances (CSIs) and each CSI represents one or more of the VMs to be managed by the AMF;
generate a second portion of the configuration to associate each VM to one of the CSIs, such that the VMs to be hosted on a same physical node are associated with different CSIs of a same SI; and
generate a third portion of the configuration to configure the SUs of different SGs such that each SU is hosted on one VM and different SUs of a same SG are hosted on the VMs on different physical nodes, thereby the configuration enabling the AMF to manage the application hosted on the VMs without modification to the application as in a non-virtualized environment, wherein the AMF manages life-cycle and availability of the VMs through virtual machine monitors (VMMs) represented in the configuration as components.

11. The system of claim 10, wherein the VMs are migration-enabled such that during runtime each VM is migratable among the different physical nodes.

12. The system of claim 10, wherein the AMF further manages life-cycle and availability of each VM through component life-cycle command line interface (CLI) commands that are configured for the AMF to start, stop and cleanup the VM.

13. The system of claim 10, wherein the one or more processors are further adapted to:
create a first cluster managed by a first instance of the AMF wherein the first cluster is formed by the physical nodes hosting the SUs and components providing the SIs and the CSIs associated with the VMs;
create a second cluster managed by a second instance of the AMF wherein the second cluster is formed by the VMs, wherein the first instance and the second instance operate independently; and
generate the configuration including the first cluster and the second cluster.

14. The system of claim 10, wherein when generating the second portion of the configuration the one or more processors are adapted to rank the SUs such that the SUs on the different physical nodes are selected for the assignments of different SIs providing redundant VMs.

15. The system of claim 10, wherein when generating the second portion of the configuration the one or more processors are adapted to set an SI weight attribute and a node capacity attribute such that each physical node has capacity only for a single SI of a group of SIs providing redundant VMs.

16. The system of claim 10, wherein the VMs that host the SUs of the same SG are mapped to a same CSI of different SIs when a No-redundancy redundancy model is used.

17. The system of claim 10, wherein the VMs that host the SUs of the same SG are mapped to a same SI when an N-way-active redundancy model is used.

18. The system of claim 10, wherein the VMs form a same cluster as the physical nodes, and wherein the one or more processors are further adapted to control an order in which the VMs start by establishing dependencies between the SIs through which the VMs are provided.

19. A system adapted to generate a configuration for a highly available system to enable Availability Management Framework (AMF) to manage a plurality of virtual machines (VMs) and an application hosted on the VMs and to support hardware redundancy for each of a plurality of service groups (SGs) that form the application, wherein each SG includes a plurality of service units (Sus) which are units of redundancy for services provided and protected by the SG, the system comprising:
  a first generation module including circuitry configured to generate a first portion of the configuration that configures a set of service instances (SIs) to represent workload that the VMs place on physical nodes, wherein each SI contains a set of component service instances (CSIs) and each CSI represents one or more of the VMs to be managed by the AMF;
  a second generation module including circuitry configured to generate a second portion of the configuration that associates each VM to one of the CSIs, such that the VMs to be hosted on a same physical node are associated with different CSIs; and
  a third generation module including circuitry configured to generate a third portion of the configuration that configures the SUs of different SGs such that each SU is hosted on one VM and different SUs of a same SG are hosted on the VMs on different physical nodes, thereby the configuration enabling the AMF to manage the application hosted on the VMs without modification to the application as in a non-virtualized environment, wherein the AMF manages life-cycle and availability of the VMs through virtual machine monitors (VMMs) represented in the configuration as components.

20. A computer-implemented method for managing service availability of a highly available system that is hosted on a set of physical nodes, the method comprising:
  modeling the physical nodes as a first cluster of an Availability Management Framework (AMF) configuration;
  modeling virtual machines (VMs) hosted on the physical nodes as a second cluster of the AMF configuration, wherein the VMs are adapted to execute one or more application components of the highly available system, and wherein the AMF manages life-cycle and availability of the VMs through virtual machine monitors (VMMs) represented in the configuration as components; and
  managing the first cluster with a first AMF instance and the second cluster with a second AMF instance, wherein the first AMF instance and the second AMF instance operate independently.

21. The method of claim 20, wherein each of the VMs is represented as a component service instance (CSI) in the AMF configuration.

22. The method of claim 21, wherein the VMs to be hosted on a same physical node are associated with different CSIs.

23. The method of claim 20, wherein the AMF configuration supports hardware redundancy for each of a plurality of service groups (SGs) that form an application, each SG includes a plurality of service units (SUs) which are units of redundancy for services provided and protected by the SG, each SU of different SGs in the second cluster is hosted on one VM and different SUs of a same SG are hosted on the VMs on different physical nodes.

24. The method of claim 20, wherein the AMF configuration enables management of an application hosted on the VMs without modification to the application, as in a non-virtualized environment.

* * * * *